United States Patent [19]
Schuman et al.

[11] Patent Number: 5,891,505
[45] Date of Patent: *Apr. 6, 1999

[54] METHOD FOR PRESSURE PROCESSING A PUMPABLE FOOD SUBSTANCE

[75] Inventors: Bruce M. Schuman; Edmund Y. Ting, both of Kent, Wash.

[73] Assignee: Flow International Corporation, Kent, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 832,229

[22] Filed: Apr. 3, 1997

Related U.S. Application Data

[62] Division of Ser. No. 590,297, Jan. 23, 1996.

[51] Int. Cl.$^6$ ........................................ A23L 3/00
[52] U.S. Cl. .......................... 426/665; 422/39; 426/521
[58] Field of Search ................................ 426/665, 516, 426/521, 522, 448; 99/453, 461, 467; 422/39, 295

[56] References Cited

U.S. PATENT DOCUMENTS

| | | | |
|---|---|---|---|
| 2,644,401 | 7/1953 | Ragland | 103/45 |
| 3,094,074 | 6/1963 | Tuckey | 103/44 |
| 3,405,642 | 10/1968 | Freeman | 103/50 |
| 4,160,408 | 7/1979 | Ulvestad | 99/348 |
| 4,259,051 | 3/1981 | Shatila | 425/133 |
| 4,325,296 | 4/1982 | Ukai et al. | 99/468 |

(List continued on next page.)

FOREIGN PATENT DOCUMENTS

| | | |
|---|---|---|
| 0 687 421 A1 | 12/1995 | European Pat. Off. . |
| 0713654A1 | 5/1996 | European Pat. Off. . |
| 0772981A1 | 6/1997 | European Pat. Off. . |
| 1 336 044 | 7/1963 | France . |

(List continued on next page.)

OTHER PUBLICATIONS

Flyer, "Hydro-Pneumatic Accumulators," American Bosch, Springfield, Mass., Sep. 1976.

Hashish, M., "Comparative Evaluation of Abrasive-Fluidjet Machining Systems," presented in papers of High Energy Beam Manufacturing Technologies at the *Winter Annual Meeting of The American Society of Mechanical Engineers*, San Francisco, California, Dec. 10–15, 1989.

(List continued on next page.)

*Primary Examiner*—George Yeung
*Attorney, Agent, or Firm*—Seed and Berry LLP

[57] ABSTRACT

An improved method and apparatus for pressure processing a pumpable substance are shown and described. In a preferred embodiment, a valve is coupled to a source of a pumpable food substance and a pressure vessel, the valve being movable to a first, second and third position. When the valve is in a first position, an inlet port in the valve is aligned with a passageway that is open to the pressure vessel. When the valve is in the second position, the valve body seals the passageway, and when the valve is in the third position, an outlet port provided in the valve is aligned with the passageway. The valve is therefore moved to a first position to allow a volume of pumpable substance to be forced into the pressure vessel, the valve is moved to a second position to seal the passageway while the pumpable substance is pressurized to a selected pressure for a selected period of time to achieve a desired result, and the valve is then moved to a third position to allow the treated, pumpable substance to be discharged from the pressure vessel. The inlet port and the outlet port are provided with low-pressure seals, and high-pressure seals are provided in the valve such that when the valve is in the second position, the passageway is sealed by the high-pressure seals. By separating the low-pressure and high-pressure regions and functions of the valve, high-pressure containment is simplified, and it is possible to use relatively large passageways, thereby increasing the flow rate and variety of substances that may be processed.

2 Claims, 6 Drawing Sheets

U.S. PATENT DOCUMENTS

| | | | |
|---|---|---|---|
| 4,439,113 | 3/1984 | Owen | 417/394 |
| 4,483,458 | 11/1984 | Minning et al. | 220/320 |
| 4,565,297 | 1/1986 | Korner et al. | 220/254 |
| 4,659,472 | 4/1987 | Nordlund et al. | 210/609 |
| 4,695,472 | 9/1987 | Dunn et al. | 426/237 |
| 4,707,952 | 11/1987 | Krasnoff | 51/410 |
| 4,723,387 | 2/1988 | Krasnoff | 51/410 |
| 4,789,313 | 12/1988 | Tower et al. | 417/388 |
| 5,037,276 | 8/1991 | Tremoulet, Jr. | 417/567 |
| 5,037,277 | 8/1991 | Tan | 417/567 |
| 5,048,404 | 9/1991 | Bushnell et al. | 99/451 |
| 5,075,124 | 12/1991 | Horie et al. | 426/577 |
| 5,184,434 | 2/1993 | Hollinger et al. | 51/317 |
| 5,213,029 | 5/1993 | Yutaka | 99/474 |
| 5,226,799 | 7/1993 | Raghavan et al. | 417/53 |
| 5,228,394 | 7/1993 | Kanda et al. | 99/453 |
| 5,232,726 | 8/1993 | Clark et al. | 426/519 |
| 5,235,905 | 8/1993 | Bushnell et al. | 99/451 |
| 5,288,462 | 2/1994 | Carter et al. | 422/39 |
| 5,316,745 | 5/1994 | Ting et al. | 422/295 |
| 5,370,043 | 12/1994 | Träff et al. | 99/467 |
| 5,439,703 | 8/1995 | Kanda et al. | 426/665 |
| 5,458,901 | 10/1995 | Engler et al. | 426/521 |
| 5,470,547 | 11/1995 | Lhenry | 422/295 |
| 5,579,682 | 12/1996 | Bergman et al. | 99/473 |
| 5,585,076 | 12/1996 | Buteau et al. | 422/295 |
| 5,588,357 | 12/1996 | Tomikawa et al. | 99/451 |
| 5,593,714 | 1/1997 | Hirsch | 426/268 |
| 5,622,105 | 4/1997 | Bergman | 100/245 |
| 5,622,678 | 4/1997 | Hiltawsky et al. | 422/295 |
| 5,658,610 | 8/1997 | Bergman et al. | 426/665 |

FOREIGN PATENT DOCUMENTS

| | | | |
|---|---|---|---|
| 2 087 099 | 12/1971 | France | F04B 49/00 |
| 2442018 | 7/1980 | France . | |
| 2690854 | 11/1993 | France . | |
| 4242311 | 8/1993 | Germany . | |
| 4406028A1 | 8/1995 | Germany . | |
| 53-124176 | 10/1978 | Japan | A61L 1/00 |
| 58-150078 | 6/1983 | Japan | F04B 9/12 |
| 62-066862 | 3/1987 | Japan | A01L 2/02 |
| 62-069969 | 3/1987 | Japan | A23C 3/00 |
| 62-66862 | 3/1987 | Japan . | |
| 62-122546 | 6/1987 | Japan | A21C 11/20 |
| 63-82667 | 4/1988 | Japan . | |
| 1-196251 | 8/1989 | Japan | A22C 25/00 |
| 1-300841 | 12/1989 | Japan | A22C 25/00 |
| 2-089598 | 3/1990 | Japan | B30B 11/00 |
| 2-089877 | 3/1990 | Japan | A23L 3/01 |
| 2-182157 | 7/1990 | Japan | A23L 1/01 |
| 2-245146 | 9/1990 | Japan | A23L 1/025 |
| 3-080066 | 4/1991 | Japan | A23L 1/01 |
| 3-147772 | 6/1991 | Japan | A23L 1/20 |
| 3-292863 | 12/1991 | Japan | A23J 3/26 |
| 4-036569 | 2/1992 | Japan | A23L 1/20 |
| 4-108369 | 4/1992 | Japan | A23L 3/01 |
| 4-299967 | 10/1992 | Japan | A23L 3/015 |
| 4-356177 | 12/1992 | Japan | A23L 3/015 |
| 5-023118 | 2/1993 | Japan | A23L 1/01 |
| 5-056752 | 3/1993 | Japan | A23J 3/26 |
| 5-161483 | 6/1993 | Japan | A23L 3/015 |
| 5-227926 | 9/1993 | Japan | A23L 3/015 |
| 5-252920 | 10/1993 | Japan | 426/665 |
| 5-284950 | 11/1993 | Japan | A23L 1/015 |
| 6-014726 | 1/1994 | Japan | A23L 1/01 |
| 6-125753 | 5/1994 | Japan | A23L 3/015 |
| 7-147929 | 6/1995 | Japan | A23L 1/275 |
| 7-180770 | 7/1995 | Japan | F16J 10/00 |
| 2 184 791 | 7/1987 | United Kingdom | F04B 43/10 |
| WO 94/21145 | 9/1994 | WIPO . | |
| WO 95/21690 | 8/1995 | WIPO . | |
| WO 96/11588 | 4/1996 | WIPO . | |
| WO 97/21361 | 6/1997 | WIPO . | |

OTHER PUBLICATIONS

Hori, K. and Sekimoto, T., "The Development of High Pressure Processor for Food Industries," Mitsubishi Heavy Industries, Ltd., Hiroshima Machinery Works.

Flyer, "Floating Piston Accumulators," Greer Olaer Products, Greer Hydraulics, Inc., 5930 West Jefferson Boulevard, Los Angeles, California 90016.

Rovere, Dr. Pierpaolo, "The Third Dimension of Food Technology," in *Food Technologist High Pressure Processing*, ABB Industria—Milan, Italy; Tetra Pak—Lund, Sweden, 1995.

Hashish, Mohamed, "Flow Research Proposal No. 8251: Experimental and Theoretical Investigation of Metals Cutting by Abrasive Jets: Phase II Program," Prepared for *National Science Foundation*, Apr. 1982.

Balny, Hayashi, Heremans and Patrick Masson, "High Pressure and Biotechnology," in *Colloque Inserm vol. 224*: pp. 499–507, Sep. 1992.

QUEST Integrated, Inc. Project Summary, "High Velocity Jet Cutting with Liquefied Gases," Jun. 14, 1991.

Flow Technology Proposal No. 8265, "Development of a High–Pressure Abrasive Jet Cutting Tool for Enhancement of Fracturing in Unconventional Natural Gas Formations (Phase I): Part A. Technical Proposal," Submitted to *Gas Research Institute*, Oct. 1981.

Flow Industries, Inc., Research and Technology Division Technical Proposal, "Development of an Improved Oil Well Drilling Method Using Fluid–Abrasive Jets," Apr. 1983.

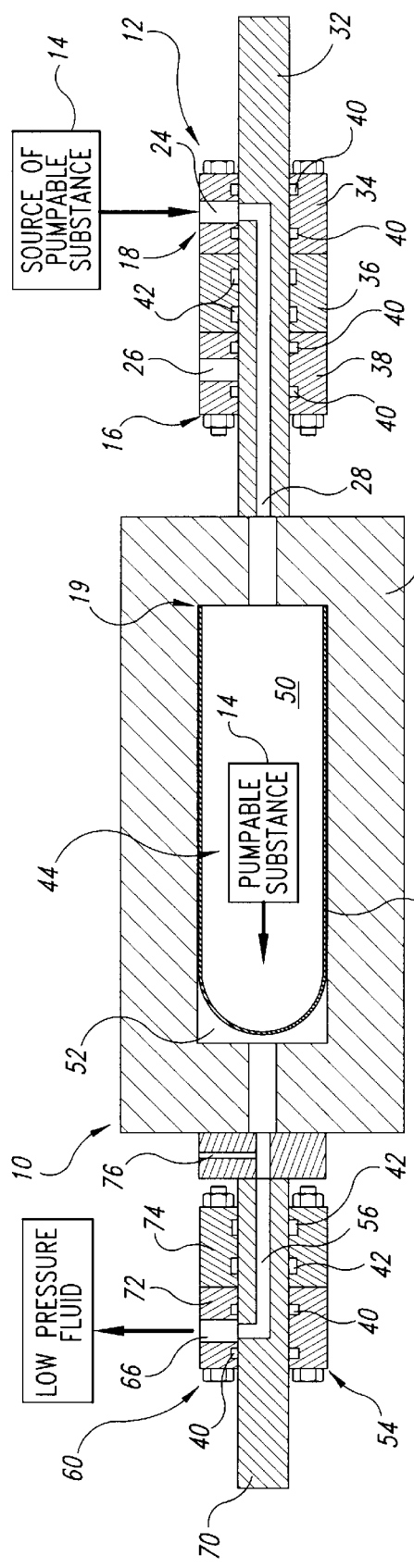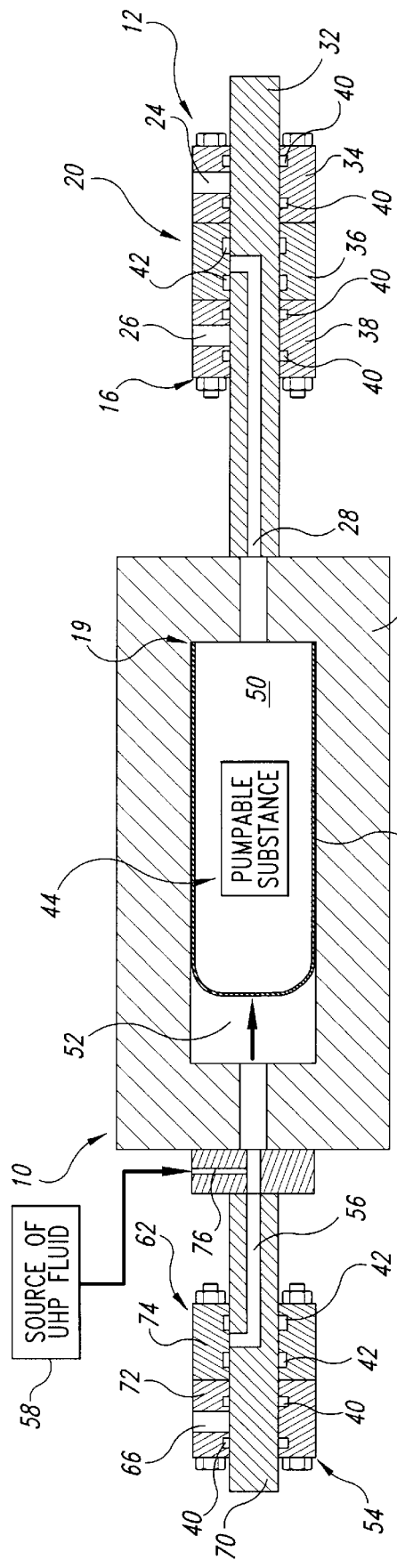

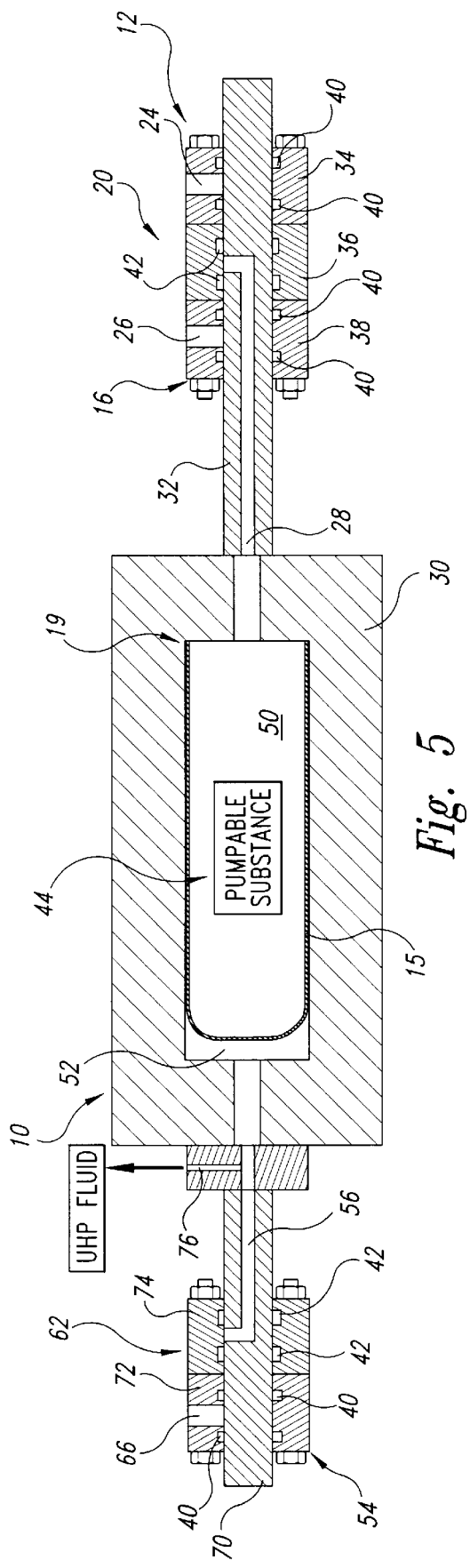

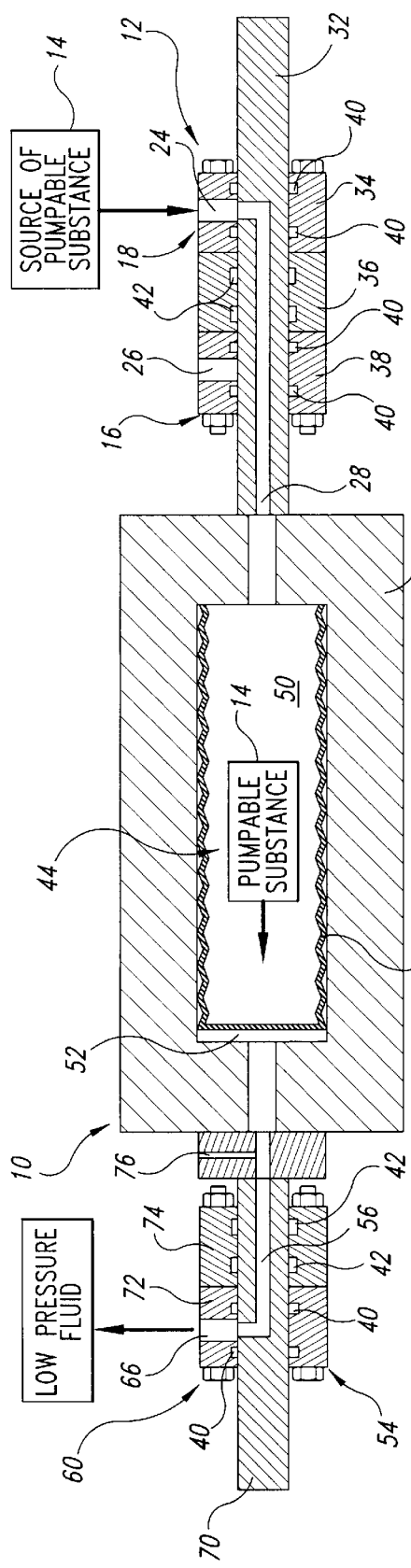
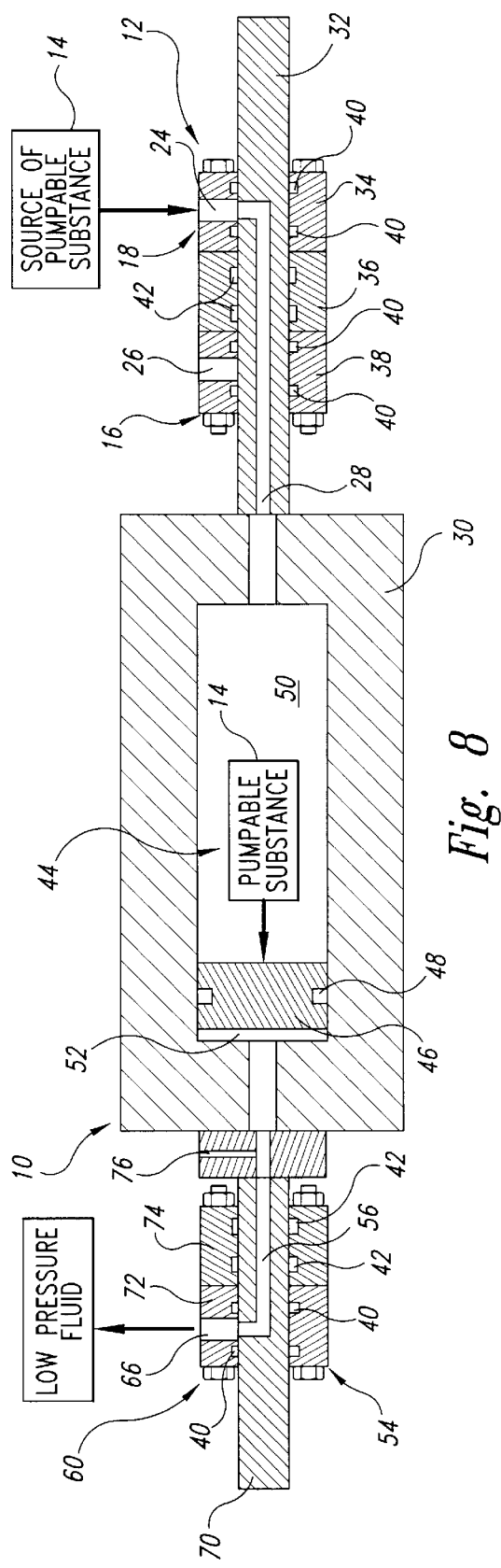
Fig. 7
Fig. 8

METHOD FOR PRESSURE PROCESSING A PUMPABLE FOOD SUBSTANCE

CROSS-REFERENCE TO RELATED APPLICATION

This application is a division of U.S. patent application Ser. No. 08/590,297, filed Jan. 23, 1996.

TECHNICAL FIELD

This invention relates to an improved method and apparatus for pressure processing a pumpable food substance or the like.

BACKGROUND OF THE INVENTION

Many objectives may be achieved by exposing a pumpable substance, for example, any pumpable food substance, to ultrahigh-pressure. For example, many fresh food products may be pasteurized by exposing them to ultrahigh-pressure for a selected amount of time, thereby killing microorganisms. Ultrahigh-pressure may also be used to render a desired physical change in a food product, for example, to improve moisture retention, to cause gelation of starchy suspensions, or to raise the melting point of butter and soft fats. Ultrahigh-pressure processing may be used to improve the quality of existing products, and to generate new products.

Currently, the majority of pressure-based food processing is achieved by loading a food product into a large pressure vessel. Typically, the food is prepackaged in flexible packets. The pressure vessel is then closed and pressurized to a selected pressure. This pressure is maintained for a selected amount of time, commonly referred to as the "dwell time," to achieve the desired physical change in the food product. The vessel is then depressurized, and the contents unloaded.

Although current systems produced desirable results, they also have several disadvantages. For example, large pressure vessels are costly to construct. These current systems are also time consuming to use, given the nature of the processing.

SUMMARY OF THE INVENTION

It is therefore an object of the present invention to provide an improved ultrahigh-pressure method and apparatus for processing a pumpable substance.

It is another object of this invention to provide in a preferred embodiment an improved ultrahigh-pressure method and apparatus for processing a pumpable food substance that is less expensive to use than currently available systems.

It is another object of this invention to provide i a preferred embodiment a faster and more efficient method and apparatus for processing a pumpable food substance.

These and other objects of the invention, as will be apparent herein, are accomplished by providing an improved ultrahigh-pressure system that processes a pumpable substance, such as a food product, preferably on a continuous basis. In a preferred embodiment, a valve is coupled to a source of a pumpable substance to be treated, and to a pressure vessel. The valve is moveable to a first, second and third position. The valve is comprised of three segments, and has an inlet port in a first segment, and an outlet port in a third segment. In a preferred embodiment, the valve is slidably movable along a shaft that passes through a longitudinal axis of the valve, a passageway being provided in the shaft that is open to the pressure vessel. When the valve is in the first position, the inlet port is aligned with the passageway, thereby allowing a volume of pumpable substance to flow through the inlet port and passageway into the pressure vessel. The valve is then slid along the shaft to the second position, thereby sealing the passageway against the valve. The pumpable substance is then pressurized to a selected pressure for a selected period of time, depending on the desired result, after which the pumpable substance is depressurized. The valve is then moved to the third position, thereby aligning the outlet port with the passageway and allowing the pumpable substance to be discharged from the pressure vessel.

In a preferred embodiment, the pressure vessel has a chamber that is divided into a first region and a second region by an isolating member that is sealed along the width of the pressure chamber and that is free to move or expand and contract along the length of the pressure chamber. As the volume of pumpable substance flows into the first region of the chamber, it pushes the isolating member along the length of the chamber to accommodate the volume of pumpable substance.

In a preferred embodiment, a pressurizing medium such as ultrahigh-pressure fluid, is introduced into the second region of the chamber via a second valve, the ultrahigh-pressure fluid acting on the isolating member which in turn compresses and pressurizes the pumpable substance. The second valve is moveable to a first and second position and is comprised of a first and second segment. A port is provided in the first segment, which is aligned with a second passageway that is open to the second region of the chamber, when the second valve is in a first position. When the second valve is moved to a second position, the second passageway is sealed by the second valve. The second passageway is coupled to a source of ultrahigh-pressure fluid. Therefore, a volume of ultrahigh-pressure fluid is introduced through the second passageway into the second region to pressurize the pumpable substance as described above, while the second valve is in the second position. After a selected amount of time, the pressure is released by allowing a quantity of the ultrahigh-pressure fluid to flow out of the second region, and the second valve is moved to a first position. A volume of low-pressure fluid is introduced through the port and flows through the second passageway into the second region, thereby acting on the isolating member and discharging the pumpable substance from the chamber, the pumpable substance exiting through the first passageway and the outlet port of the first valve, the first valve being in its third position.

In a preferred embodiment, low-pressure seals are provided on opposing sides of each of the inlet and outlet ports of the first valve, and on opposing sides of the port of the second valve. Two high-pressure seals are provided in the second segment of each of the first and second valves, such that when the first and second valves are in their respective second positions, the two high-pressure seals of each valve are positioned on opposing sides of the first and second passageways, respectively, thereby sealing the passageways.

By providing a system in accordance with a preferred embodiment of the present invention, it is possible to use ports and passageways having relatively large inner diameters, thereby allowing the processing of viscous food products, food products containing solid inclusions, and to allow high flow rates of low viscosity fluids, while still adequately sealing against the ultrahigh-pressures. Conventional ultrahigh-pressure systems use tubing having a much smaller inner diameter and conventional ultrahigh-pressure valve seats. If the ultrahigh-pressure valve and tubing are scaled up to accommodate viscous food products, high separation forces are generated at the ultrahigh-pressure shut off valve seats. In the preferred embodiment of the present invention illustrated herein, the ultrahigh-pressure valve seats are eliminated, thereby simplifying the high-pressure containment and allowing the use of large passageways and high flow rates into and out of the pressure vessel.

In a preferred embodiment, multiple systems as described above are coupled together in parallel, thereby processing large volumes of pumpable substance in a fast, cost effective manner.

BRIEF DESCRIPTION OF THE DRAWINGS

FIGS. 3–6 are conceptual, cross-sectional elevational views of a system provided in accordance with a preferred embodiment of the present invention, in four different stages of operation.

FIG. 7 is a conceptual, cross-sectional elevational view of a system provided in accordance with an alternative embodiment of the present invention.

FIG. 8 is a conceptual, cross-sectional elevational view of a system provided in accordance with an alternative embodiment of the present invention.

DETAILED DESCRIPTION OF THE INVENTION

Many objectives may be achieved by processing a pumpable substance, for example, a pumpable food substance such as soup, jam, or fruit juice, with ultrahigh-pressure. Such pressure processing may be used, for example, to pasteurize a food product, or to render a desired physical change that can be accomplished by pressurizing the food substance to a selected pressure for a selected period of time. Although the selected pressure and dwell time required to achieve a desired result will vary with the desired result and the given food substance, pressures in the range of 40,000–130,000 psi may be used. The selected pressure and dwell time to achieve a desired result in a given food substance is known for a variety of food products to one of ordinary skill in the art, or may be determined without undue experimentation.

Figure 1:
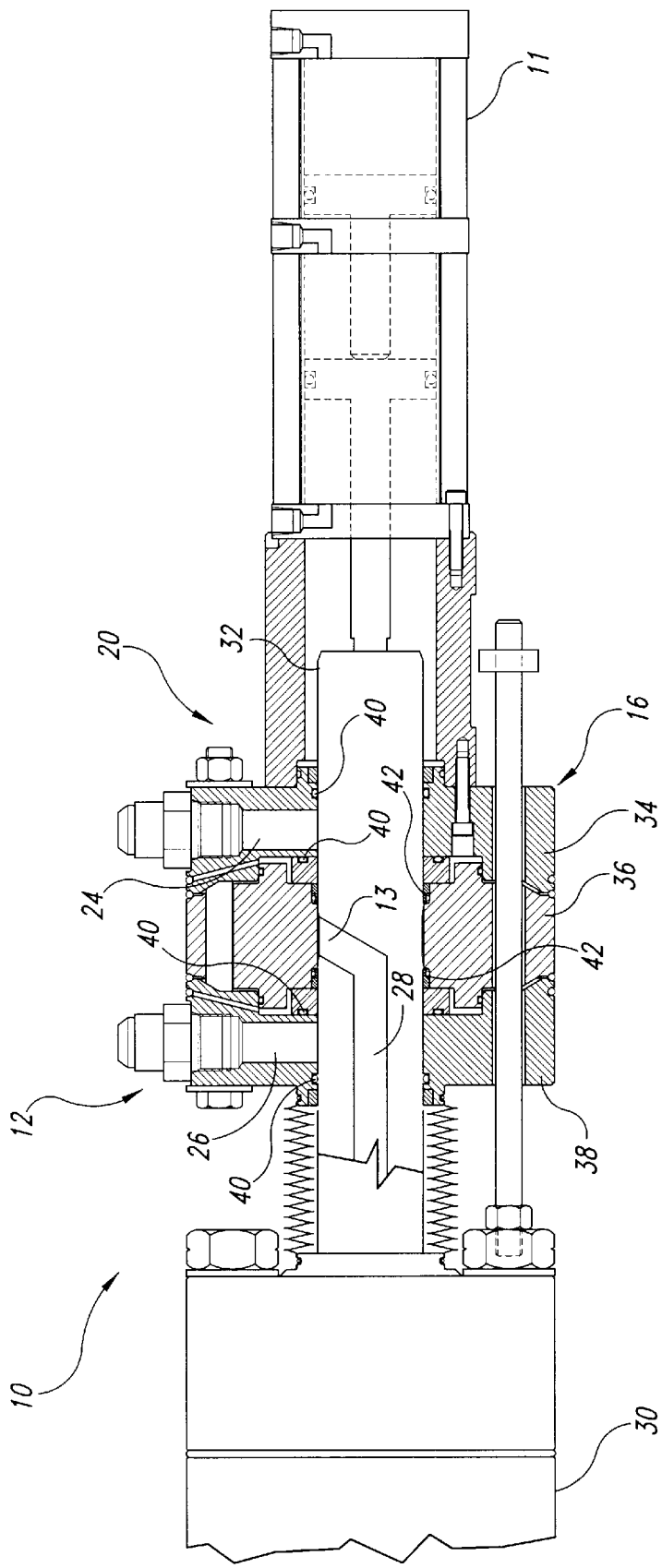
FIG. 1 is a cross-sectional elevational view of a valve provided in accordance with a preferred embodiment of the present invention.
Figure 2:
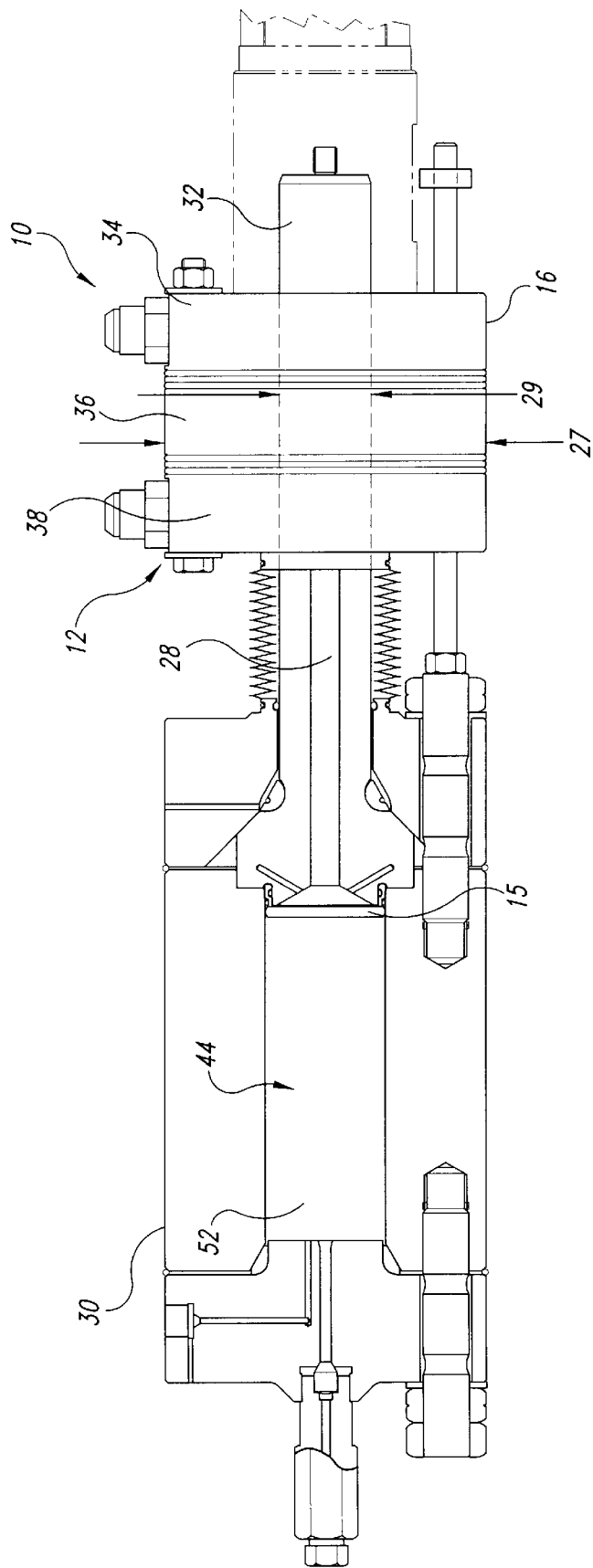
FIG. 2 is a partial cross-sectional elevational view of a system for processing a pumpable substance provided in accordance with a preferred embodiment of the present invention.
Figure 9:
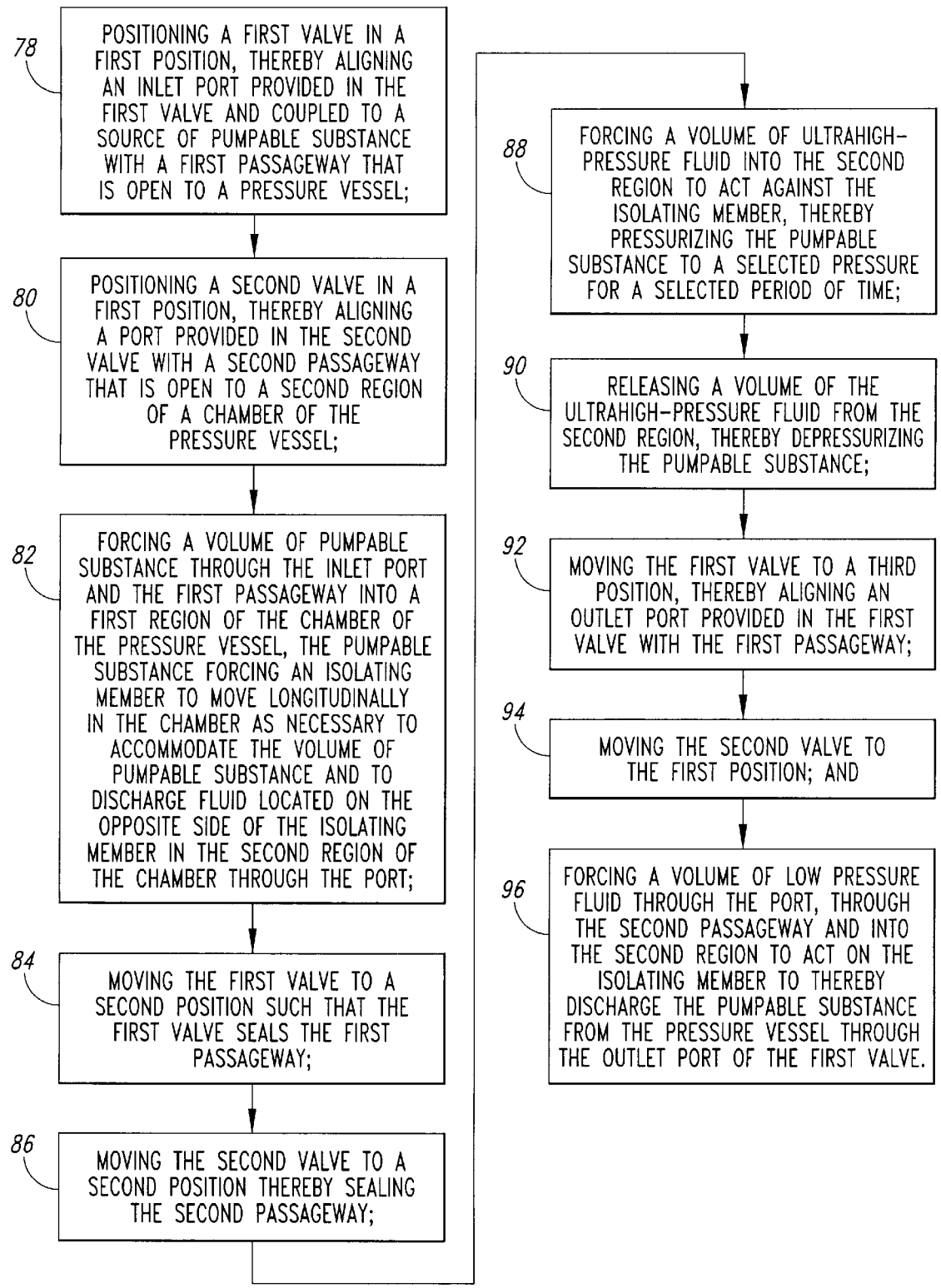
FIG. 9 is a diagram illustrating the steps of a preferred embodiment of the present invention.

A preferred method and apparatus for pressure processing a pumpable substance is provided in accordance with a preferred embodiment of the present invention. As illustrated in FIG. 1 and conceptually illustrated in FIGS. 3–6, the pressure processing system 10 includes a first valve 12 having a valve body 16 that is movable to a first position 18, second position 20, and third position 22. Although valve 12 may be moved to these three positions by any appropriate means such as a motor or screwdrive, in a preferred embodiment, valve 12 is moved to a selected position by air cylinder 11.

As illustrated in FIGS. 1 and 3–6, the valve 12 has an inlet port 24 and an outlet port 26. When the valve 12 is in the first position 18, inlet port 24 is aligned with passageway 28 which in turn is open to a chamber 44 of pressure vessel 30. Inlet port 24 is coupled to a source of pumpable substance 14, such that when the valve 12 is in the first position 18, a volume of pumpable substance 14 may be forced into pressure vessel 30. The valve 12 further has an outlet port 26 that is aligned with the passageway 28 when the valve is in the third position 22. When the valve 12 is in the second position 20, the valve body 16 seals passageway 28. In a preferred embodiment, valve 12 is slidably movable along a first shaft 32 that passes through a longitudinal axis of the valve. The passageway 28 is provided in the first shaft 32.

In a preferred embodiment, valve 12 is comprised of a first segment 34, a second segment 36, and a third segment 38, the inlet port 24 being provided in the first segment 34 and the outlet port 26 being provided in the third segment 38. As further illustrated in FIGS. 1 and 3–6, low-pressure seals 40 are provided on opposing sides of both the inlet port 24 and outlet port 26, and two high-pressure seals 42 are provided in the second segment 36. As illustrated in FIGS. 4 and 5, when the valve 12 is in the second position 20, the passageway 28 is aligned with the second segment 36 such that the high-pressure seals 42 are provided on opposing sides of passageway 28. In a preferred embodiment, the high-pressure seals 42 are spaced apart by a distance equal to at least two times the inner diameter of passageway 28, thereby reducing the stress concentration near the entrance 13 of passageway 28. As a result, fatigue damage is reduced and the life of shaft 32 is increased.

To further ensure proper pressure containment, the ratio of the outer diameter 27 to the inner diameter 29 of the high-pressure second segment 36 is at least 2.5 to 1, with preferred results being achieved when the ratio is 3 to 1. The first and third segments 34 and 38 are low-pressure segments and may therefore be made with lower strength materials or with a thinner wall thickness, for example, having an outer diameter to inner diameter ratio that is less than 2.5.

By providing a valve in accordance with the preferred embodiment of the present invention, the high-pressure region and function is separated from the low-pressure regions and functions, thereby allowing the use of an inlet port 24, outlet port 26, and passageway 28 having a relatively large inner diameter, as compared to conventional ultrahigh-pressure tubing. More particularly, a conventional ultrahigh-pressure system uses plumbing lines having a small inner diameter, on the order of ⅛-inch, as well as high-pressure valve seats such as poppet valves. A conventional system is therefore incapable of handling viscous substances or substances having solid inclusions, or high flow rates of non-viscous fluids. If a conventional ultrahigh-pressure system were scaled up in size to accommodate these type of systems and operating conditions, high separation forces are generated at the high-pressure shut-off seats, thereby increasing the size and cost of the valve. In the preferred embodiment of the present invention illustrated herein, however, the ultrahigh-pressure valve seats are eliminated, the pressure forces being transferred to the strong, cylindrical second segment 36. High-pressure containment is therefore simplified, thereby allowing the use of relatively large passageways and high flow rates into and out of the pressure vessel 30. Although in a preferred embodiment an inner diameter of the inlet port 24, outlet port 26, and passageway 28 is 0.25–1.0-inch, it will be understood by one of ordinary skill in the art that the system described may be scaled up to accommodate larger inner diameters.

In a preferred embodiment as illustrated in FIGS. 2–6, the pressure vessel 30 has a chamber 44 that is divided into a first region 50 and a second region 52 by a bladder 15 that is fixed at a first end 19 of chamber 44 and that is free to expand and contract longitudinally along the length of the chamber. Therefore, as a volume of pumpable substance 14 is forced into the first region 50, the pumpable substance 14 acts against bladder 15, causing it to expand along the length of the chamber to accommodate and encapture the volume of pumpable substance. A pressurizingmedium, such as ultrahigh-pressure fluid, is introduced into the first region 50 to act against bladder 15 in the opposite direction, thereby compressing and pressurizing pumpable substance 14 to a selected pressure, for a selected period of time. The bladder therefore acts to isolate the pumpable substance from the pressurizing medium and from the inner surface of the chamber 44. This will serve to protect the pumpable substance from contamination, for example, from mixing with the pressurizing medium or from chemically reacting with the inner surface of the chamber.

In an alternative embodiment, as illustrated in FIG. 7, a bellows 17 is coupled to the first end 19 of chamber 44 and is free to expand and contract along the length of the chamber to accept, pressurize and discharge the pumpable substance. In a second alternative embodiment, as illustrated in FIG. 8, a piston 46 is provided in the chamber 44. The piston is sealed along the width of the chamber by seal 48, and is free to move longitudinally along the length of the chamber. In an alternative embodiment, the inner surface of the chamber is coated to inhibit corrosion, for example by chrome or nickel plating.

In a preferred embodiment, as illustrated in FIGS. 2–6, a second valve 54 is provided, that is movable to a first position 60 and second position 62. The second valve 54 is provided with a port 66 that is aligned with a second passageway 56, when the second valve 54 is in the first position 60. Similar to the first valve 12, the body of the second valve 54 seals the second passageway when the second valve is in the second position 62. In a preferred embodiment, the second valve 54 is slidably movable along second shaft 70 which extends through a longitudinal axis of the second valve 54, the second passageway 56 being provided in the shaft 70. For ease of disassembly for cleaning and servicing, or to allow the use of different materials to minimize cost, the second valve 54 may be provided in a first segment 72 and a second segment 74. As illustrated in FIGS. 2–6, the second passageway 56 is in fluid communication with the second region 52 of chamber 44 and is coupled to a source of ultrahigh-pressure fluid 58 via second port 76.

Therefore, as illustrated in FIGS. 3 and 7, a pumpable substance may be pressure processed in accordance with a preferred embodiment of the present invention by positioning the first valve 12 in the first position 18, such that the inlet port 24 coupled to the source of pumpable substance 14 is aligned with the first passageway 28, step 78. The second valve 54 is positioned in its first position 60 such that the port 66 is aligned with the second passageway 56, step 80. A volume of pumpable substance 14 is then forced through the inlet port and the first passageway into the first region 50 of the chamber 44 of the pressure vessel 30, the pumpable, substance 14 forcing the bladder 15 to move longitudinally in the chamber as necessary to accommodate the pumpable substance, step 82. It should be noted that during this step, fluid located on the opposite side of the bladder in the second region 52 of the chamber will be discharged through the port 66 as the pumpable substance is introduced into the first region 50.

After the first valve 12 and the second valve 54 are moved to their respective second positions to seal the first passageway 28 and the second passageway 58, respectively, steps 84 and 86, the pumpable substance is pressurized to a selected pressure for a selected period of time, step 88. In a preferred embodiment, as illustrated in FIG. 4, this is achieved by forcing a volume of ultrahigh-pressure fluid into the second region 52 via the second port 76. After the pumpable substance has been pressurized to the selected pressure for a selected period of time, the pumpable substance is depressurized, for example, by allowing a quantity of the ultrahigh-pressure fluid to flow out of the second region, step 90, as illustrated in FIG. 5.

As illustrated in FIG. 6, the first valve 12 is moved to the third position 22 and the second valve 54 is moved to the first position 60, steps 92 and 94. A volume of low-pressure fluid is forced through the port 66 of the second valve 54, the low-pressure fluid passing through the second passageway 56 into the second region 52 to act on the bladder 15, thereby discharging the pumpable substance 14 from the pressure vessel 30 through the outlet port 26 of the first valve 12, step 96.

It will be understood that the second valve 54 may alternately be provided with two low-pressure segments and a high-pressure segment, similar to the first valve 12, with a second low-pressure port being provided in the third segment. The second low-pressure port may be used to discharge fluid from the second region 52 of the chamber as pumpable substance is introduced into the first region 50, with port 66 being used to introduce a volume of low-pressure fluid into the second region 52 to discharge the pumpable substance 14, or vice versa.

An improved method and apparatus for pressure processing a pumpable substance has been shown and described From the foregoing, it will be appreciated that although embodiments of the invention have been described herein for purposes of illustration, various modifications may be made without deviating from the spirit of the invention. Thus, the present invention is not limited to the embodiments described herein, but rather is defined by the claims which follow.

We claim:

1. A method for pressure processing a pumpable food substance comprising the steps of:

positioning a first valve in a first position, thereby aligning an inlet port provided in the first valve and coupled to a source of pumpable food substance with a first passageway that is open to a pressure vessel;

forcing a volume of pumpable food substance through the inlet port and the first passageway into the pressure vessel;

moving the first valve to a second position such that the first valve seals the first passageway;

pressurizing the pumpable food substance to a selected pressure for a selected period of time;

depressurizing the pumpable food substance;

moving the first valve to a third position, thereby aligning an outlet port provided in the first valve with the first passageway; and discharging the pumpable food substance from the pressure vessel through the first passageway and the outlet port.

2. The method according to claim 1, further comprising:

positioning a second valve in a first position, thereby aligning a port provided in the second valve with a second passageway that is open to a second region of a chamber of the pressure vessel;

forcing the volume of pumpable food substance through the inlet port and the first passageway into a first region of the chamber of the pressure vessel, the pumpable food substance forcing an isolating member to move longitudinally in the chamber as necessary to accommodate the volume of pumpable food substance and to discharge fluid located on the opposite side of the isolating member in the second region of the chamber through the port;

moving the second valve to a second position thereby sealing the second passageway;

forcing a volume of ultrahigh-pressure fluid into the second region to act against the isolating member, thereby pressurizing the pumpable food substance to a selected pressure for a selected period of time;

releasing a volume of the ultrahigh-pressure fluid from the second region, thereby depressurizing the pumpable food substance;

moving the second valve to the first position; and after moving the first valve to the third position, forcing a volume of low-pressure fluid through the port, through the second passageway and into the second region to act on the isolating member to thereby discharge the pumpable food substance from the pressure vessel through the outlet port of the first valve.

* * * * *